United States Patent
Kanagasabai et al.

(10) Patent No.: US 11,622,264 B2
(45) Date of Patent: Apr. 4, 2023

(54) SYSTEMS AND METHODS FOR DYNAMIC CRYPTOGRAPHY FOR SMALL CELLS

(71) Applicant: Verizon Patent and Licensing Inc., Basking Ridge, NJ (US)

(72) Inventors: Nimalan Kanagasabai, Grapevine, TX (US); Amir Saghir, Frisco, TX (US); Mun Wei Low, Irving, TX (US); Said Hanbaly, Prosper, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 324 days.

(21) Appl. No.: 16/884,946

(22) Filed: May 27, 2020

(65) Prior Publication Data

US 2021/0377727 A1    Dec. 2, 2021

(51) Int. Cl.
| | | |
|---|---|---|
| *H04W 12/033* | (2021.01) | |
| *H04W 8/24* | (2009.01) | |
| *H04L 9/08* | (2006.01) | |
| *H04L 9/06* | (2006.01) | |
| *H04W 12/041* | (2021.01) | |

(52) U.S. Cl.
CPC ......... *H04W 12/033* (2021.01); *H04L 9/0643* (2013.01); *H04L 9/0825* (2013.01); *H04L 9/0861* (2013.01); *H04W 8/24* (2013.01); *H04W 12/041* (2021.01)

(58) Field of Classification Search
CPC . H04W 12/033; H04W 12/041; H04W 12/12; H04W 8/24; H04W 84/045; H04L 9/0643; H04L 9/0825; H04L 9/0861; H04L 63/0272; H04L 63/1466; H04L 63/164
See application file for complete search history.

(56) References Cited

U.S. PATENT DOCUMENTS

| | | | | |
|---|---|---|---|---|
| 7,151,832 | B1 * | 12/2006 | Fetkovich | H04N 21/26613 725/31 |
| 2010/0005483 | A1 * | 1/2010 | Rao | H04N 21/63345 725/25 |
| 2017/0171187 | A1 * | 6/2017 | Yin | H04L 63/083 |
| 2019/0215541 | A1 * | 7/2019 | Di Pietro | H04L 63/205 |
| 2022/0078194 | A1 * | 3/2022 | Grover | H04L 63/0457 |

OTHER PUBLICATIONS

"What is small cell technology", https://www.verizon.com/about/our-company/5g/what-small-cell-technology, Verizon News Archives, Aug. 3, 2018, 3 pages (Year: 2018).*

* cited by examiner

*Primary Examiner* — Han Yang

(57) ABSTRACT

A device within a small cell may establish a first secure communication channel between the device and a network device based on a first type of encryption. The device within the small cell may transmit data between the small cell and a core network via the first secure communication channel. The device within the small cell may receive information associated with a second type of encryption, wherein the second type of encryption is different from the first type of encryption. The device within the small cell may terminate the first secure communication channel. The device within the small cell may establish a second secure communication channel between the device and the network device based on the information associated with the second type of encryption. The device within the small cell may transmit further data between the small cell and the core network via the second secure communication channel.

20 Claims, 14 Drawing Sheets

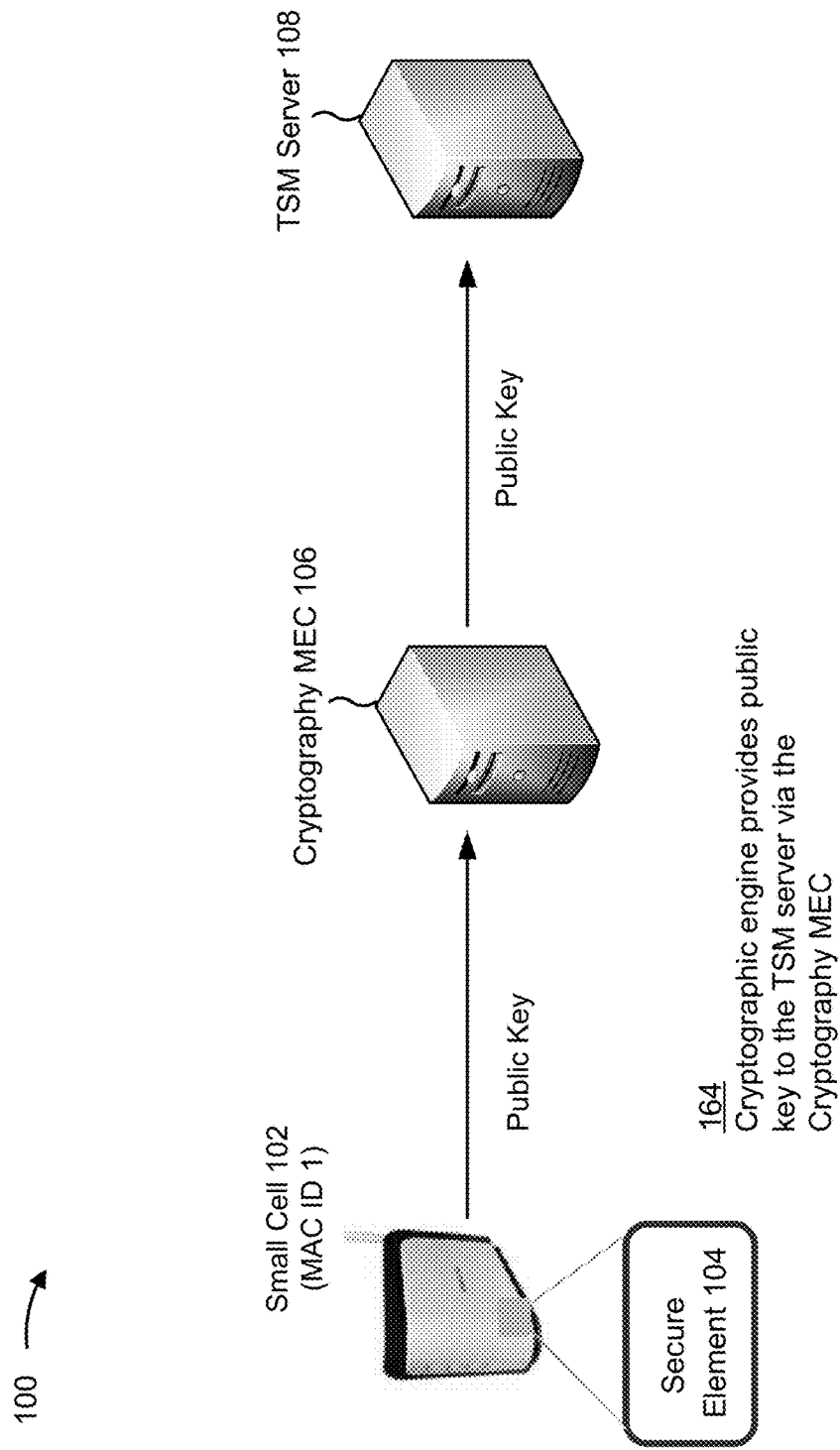

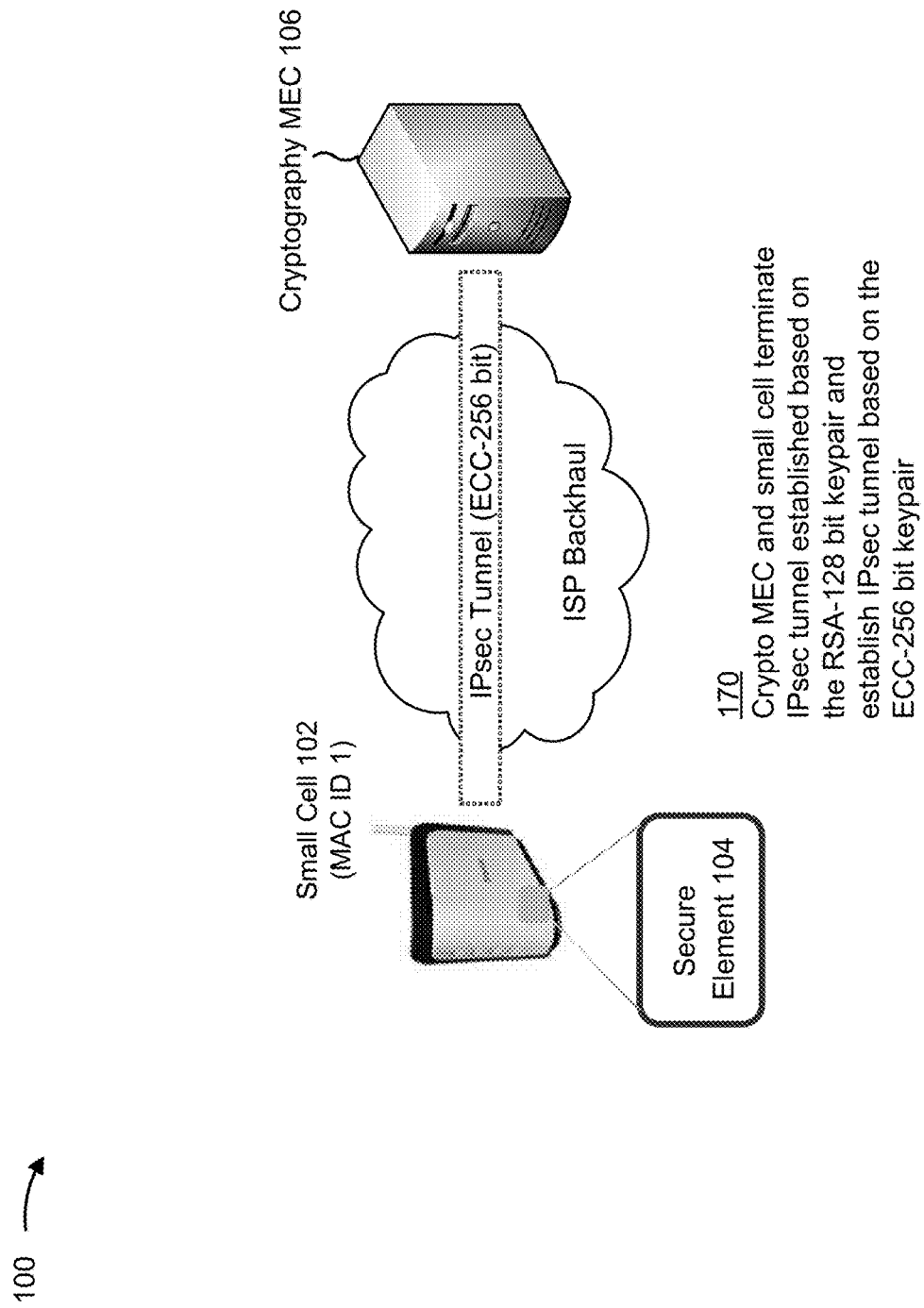

SYSTEMS AND METHODS FOR DYNAMIC CRYPTOGRAPHY FOR SMALL CELLS

BACKGROUND

Network security is the process of taking physical and software preventative measures to protect a network infrastructure from unauthorized access, misuse, malfunction, modification, destruction, improper disclosure, and/or the like. Network security creates a secure platform for computing devices, users, software programs, and/or the like to perform functions within a secure environment. Security as a service is a set of procedures in which a service provider integrates security services into an organizational infrastructure to provide higher levels of security than the organization may be capable of providing.

BRIEF DESCRIPTION OF THE DRAWINGS

FIGS. 1A-1J are diagrams of an example implementation described herein.

DETAILED DESCRIPTION OF PREFERRED EMBODIMENTS

Figure 1A:
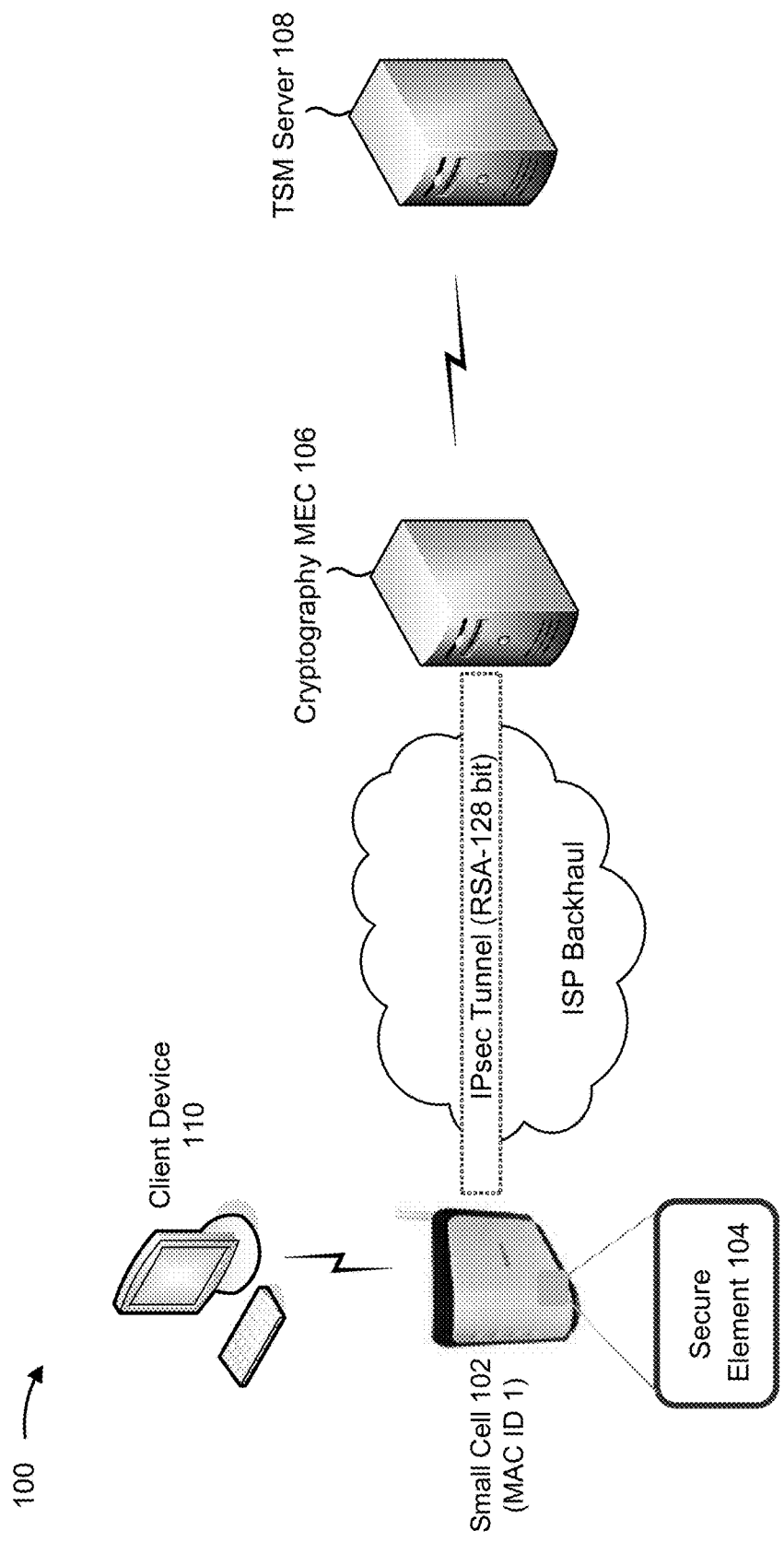

The following detailed description of example implementations refers to the accompanying drawings. The same reference numbers in different drawings may identify the same or similar elements.

A small cell (e.g., a femtocell, a picocell, a microcell, and/or the like) is a small, low-power cellular base station that connects to a network of a service provider. In some mobile networks, a small cell can be used to increase capacity, fill network coverage gaps, and/or the like. For example, a small cell can be included in a network to increase coverage in an office building, in a home, in a shopping center, and/or the like. Data is transmitted between the small cell and the network of the service provider via a broadband connection (e.g., cable, fiber optic, digital subscriber line (DSL), and/or the like).

To ensure data integrity and privacy, the small cell may utilize an Internet protocol security (IPsec) protocol to establish a secure communication channel between the small cell and a network device included in the service provider's network (e.g., via IPv4, IPv6, and/or the like). The IPsec protocol uses a security association where the small cell and the network device establish shared security attributes such as encryption algorithms and keys. To ensure adequate information security, the security attributes of the small cell are hardware and/or software locked. For example, the small cell and a secure gateway may have fixed, pre-shared keys and cryptographic algorithms. This enables the small cell and the secure gateway to establish an IPsec tunnel with statically defined tunnel endpoint encryption. As a result of using fixed, pre-shared keys, it may be difficult to change the security attributes, policies, and/or techniques when new security attributes, policies, and/or techniques are developed. In other words, after deployment of a small cell (or in a time between design of the small cell, manufacture of the small cell, and deployment of the small cell), a service provider may develop new encryption algorithms, new hash functions, and/or the like, or may determine that existing encryption algorithms, hash functions, and/or the like have been compromised.

When security attributes, such as encryption algorithms, hash functions, and/or the like) become compromised, an inability to alter security attributes of the small cell and/or the secure gateway may result in data conveyed between the small cell and the secure gateway being compromised. Further, a customer (e.g., for whom a small cell is deployed, such as an organization) may periodically desire an increased and/or decreased level of security. For example, when experiencing an attempt to compromise data or when handling particularly sensitive data, a customer may desire a higher level of security to be implemented. In contrast, when not handling sensitive data, a customer may desire a lower level of security to be implemented, to reduce a utilization of processing resources, to reduce a utilization of network resources, to increase throughput, and/or the like.

Some implementations described herein provide a cryptography engine, embedded in a secure element within a small cell. The cryptography engine allows security attributes to be dynamically configured by a client device operated by a customer or another verified party. For example, the small cell may establish a secure communication channel with a network device (e.g., a secure gateway) based on security attributes stored in the secure element and may receive updated security attributes via the secure communication channel. The cryptography engine may terminate the secure communication channel and may establish a new secure communication channel based on the updated security attributes. In this way, the small cell is able to utilize new security attributes as they are developed, when the current security attributes become compromised, and/or when a customer desires an increased and/or decreased level of security. Moreover, based on using a cryptography multi-access edge compute (MEC) engine and one or more trusted security manager (TSM) nodes, a secure element of the small cell may dynamically reconfigure security attributes without increasing a vulnerability to malicious hacking, relative to using fixed, pre-shared security attributes.

FIGS. 1A-1J are diagrams of one or more example implementations 100 described herein. As shown in FIG. 1A, example implementation 100 may include a small cell 102 (e.g., with a cryptography engine embedded in a secure element 104), a cryptography multi-access edge compute (MEC) 106, a trusted security manager (TSM) server 108, and a client device 110. In some implementations, small cell 102 and cryptography MEC 106 may communicate via an IPsec tunnel with a particular security protocol (e.g., Rivest-Shamir-Adleman (RSA)-128 bit encryption).

In some implementations, secure element 104 may include an embedded cryptography engine to enable key generation. For example, secure element 104 may be a hardware entity or software entity that enables generation of one or more keys for use in secure communications (e.g., with cryptography MEC 106). In some implementations, secure element 104 may be secured using a secure access technique to restrict a level of vulnerability of secure element 104. For example, secure element 104 may be implemented using a subscriber information module (SIM) card, a universal integrated circuit card (UICC), and/or the like. In this case, by using a physical element included in small cell 102 with restricted access (e.g., only someone with physical access to small cell 102 may access secure element 104), a level of vulnerability is reduced, relative to other types of key generation systems.

Figure 1B:
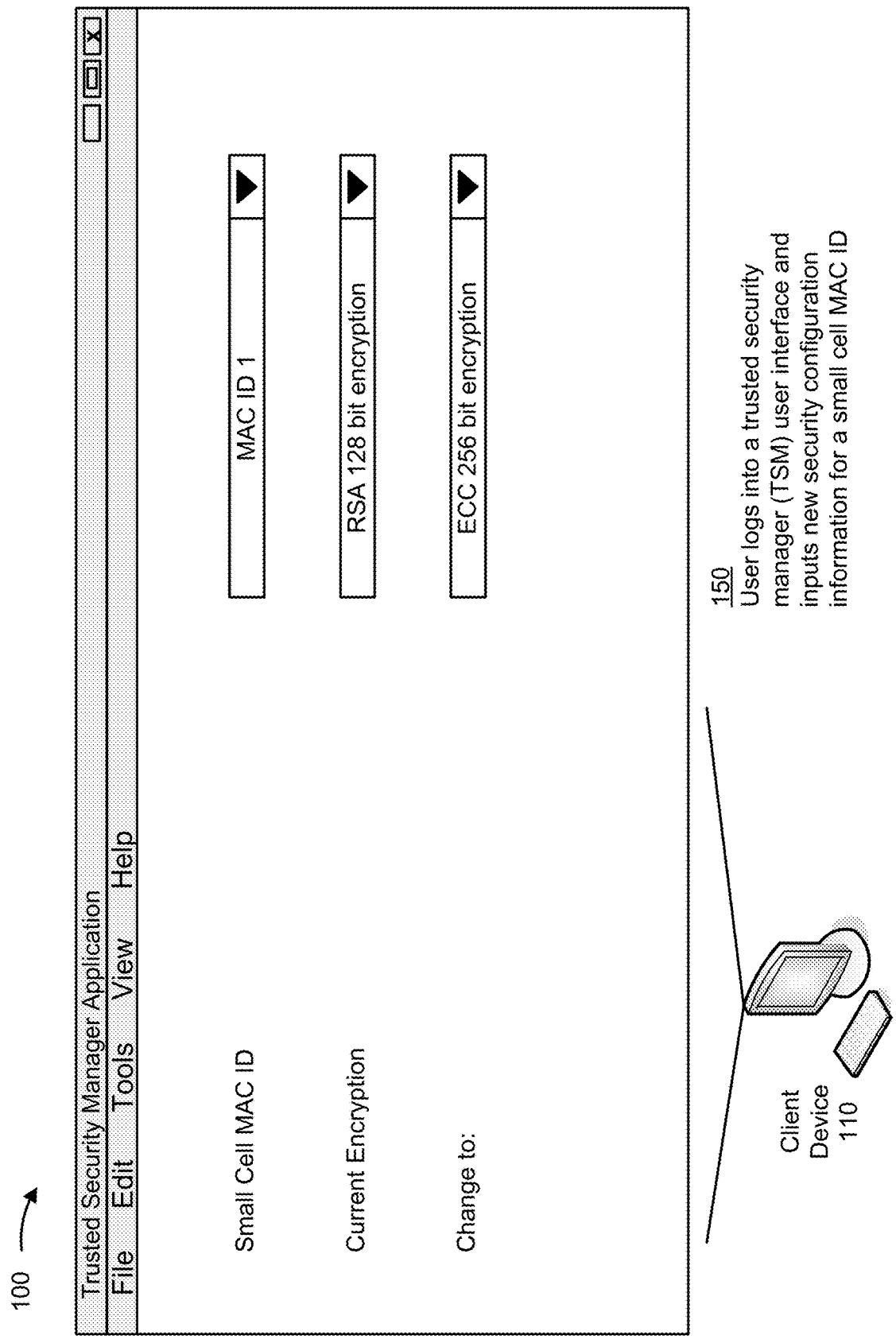

As shown in FIG. 1B, and by reference number 150, client device 110 provides access to a user interface of TSM server 108. For example, TSM server 108 may provide (e.g., via cryptography MEC 106 and small cell 102) a trusted security manager application with which to configure security attributes for a secure connection between small cell 102 and cryptography MEC 106 (e.g., the IPSec tunnel). In this case, client device 110 may receive user input associated with authenticating the user for the trusted security manager application and may communicate with TSM server 108 to authenticate the user. Based at least in part on authenticating the user, client device 110 may provide, via a user interface, information identifying a set of options for configuring security attributes. For example, client device 110 may provide information identifying a medium access control (MAC) identifier of small cell 102, a current security attribute (e.g., a current type of encryption used for the IPSec tunnel), a set of options for other available security attributes, and/or the like. In this case, the user may select a new security configuration for small cell 102 and cryptography MEC 106, such as a change from RSA-128 encryption to elliptic-curve cryptography (ECC)-256 encryption.

Additionally, or alternatively, the user may select other types of security configurations associated with other levels of security provided by TSM server 108, such as advanced encryption standard (AES) security, elliptic-curve RSA (EC-RSA) security, and/or the like. Additionally, or alternatively, the user may select to alter one or more other types of security attributes, such as a hash algorithm, a key length, a use of variable key lengths, and/or the like. Additionally, or alternatively, small cell 102 and/or client device 110 may autonomously determine to update a security attribute based at least in part on a type of network traffic, a threat detection level, and/or the like, as described in more detail herein.

Figure 1C:
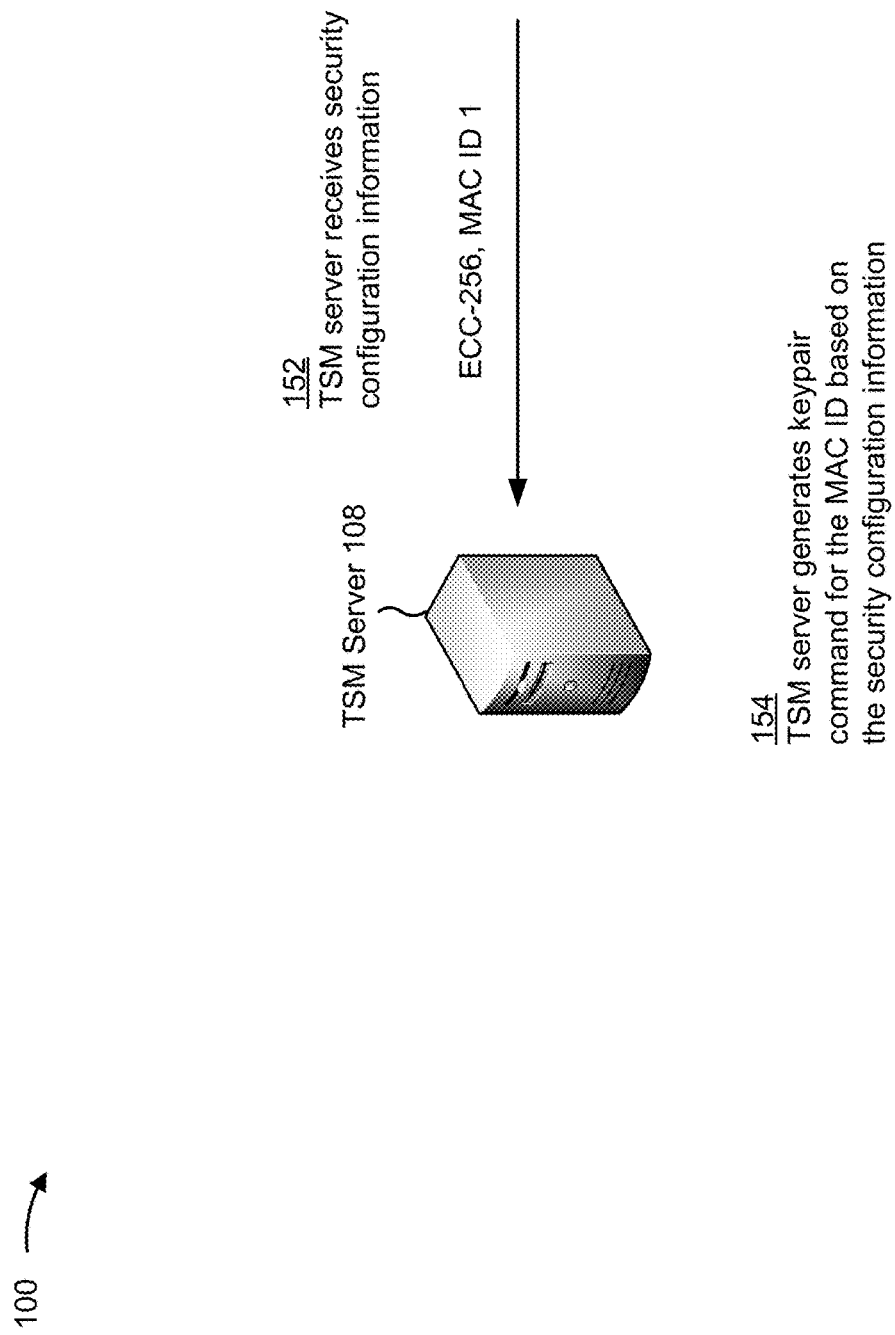

As shown in FIG. 1C, and by reference number 152, TSM server 108 may receive security configuration information. For example, TSM server 108 may receive security configuration information from client device 110 (e.g., via small cell 102 and cryptography MEC 106) based at least in part on user interaction with a user interface. In this case, the security configuration information may include information identifying small cell 102 (e.g., a MAC identifier of small cell 102), information identifying a security attribute (e.g., that TSM server 108 is to configure ECC-256 encryption), and/or the like.

Additionally, or alternatively, TSM server 108 may receive security configuration information from another configuration source. For example, a monitoring device may monitor traffic associated with the IPSec tunnel and may automatically generate security configuration information to cause a change to a security attribute. In this case, based at least in part on detecting a type of data (e.g., a level of security with which the data is to be associated), an amount of traffic, a network latency, an availability of processing resources (e.g., of small cell 102, cryptography MEC 106, client device 110, and/or the like), a threat detection level (e.g., whether a direct denial of service (DDoS) attack is detected for a network that includes small cell 102), and/or the like, the monitoring device may automatically transmit security configuration information to increase a level of security, decrease a level of security, alter a level of security, and/or the like. Additionally, or alternatively, TSM server 108 may periodically (e.g., once per week, once per month, once per year, and/or the like) receive security configuration information and/or autonomously generate security configuration information to update a security attribute of, for example, the IPSec tunnel. In some implementations, the customer may alter a quantity or type of cryptography MEC 106. For example, a customer may install additional cryptography MECs 106 or upgraded cryptography MECs 106 (e.g., cryptography MECs 106 with increased processing capabilities, routing capabilities, and/or the like), thereby enabling the customer to periodically upgrade processing, routing, and/or the like for users of small cells 102.

As further shown in FIG. 1C, and by reference number 154, TSM server 108 may generate a keypair command. For example, based at least in part on receiving the security configuration information, TSM server 108 may generate the keypair command for a MAC identifier corresponding to small cell 102. In this case, the keypair command may trigger a procedure for generating a cryptography key for a particular type of encryption, such as generating one or more cryptography keys for ECC-256.

Figure 1D:
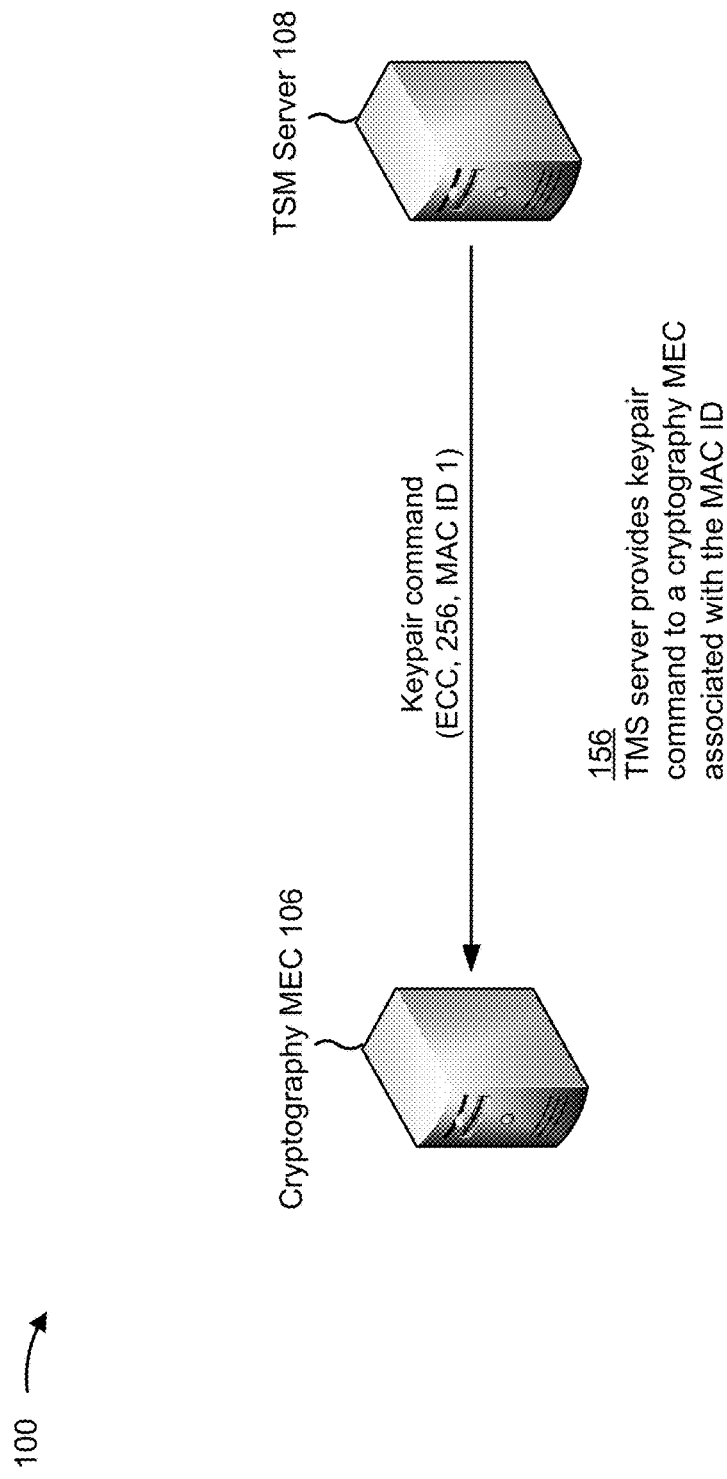

As shown in FIG. 1D, and by reference number 156, TSM server 108 may provide the keypair command to cryptography MEC 106. For example, TSM server 108 may provide a keypair command identifying the security attribute, small cell 102 (e.g., the MAC identifier of small cell 102), and/or the like. In this way, TSM server 108 provides the security configuration information for use by a hardware security module hosted by cryptography MEC 106. For example, cryptography MEC 106 may host a hardware security module that enables management of a secure tunnel endpoint at cryptography MEC 106.

Figure 1E:
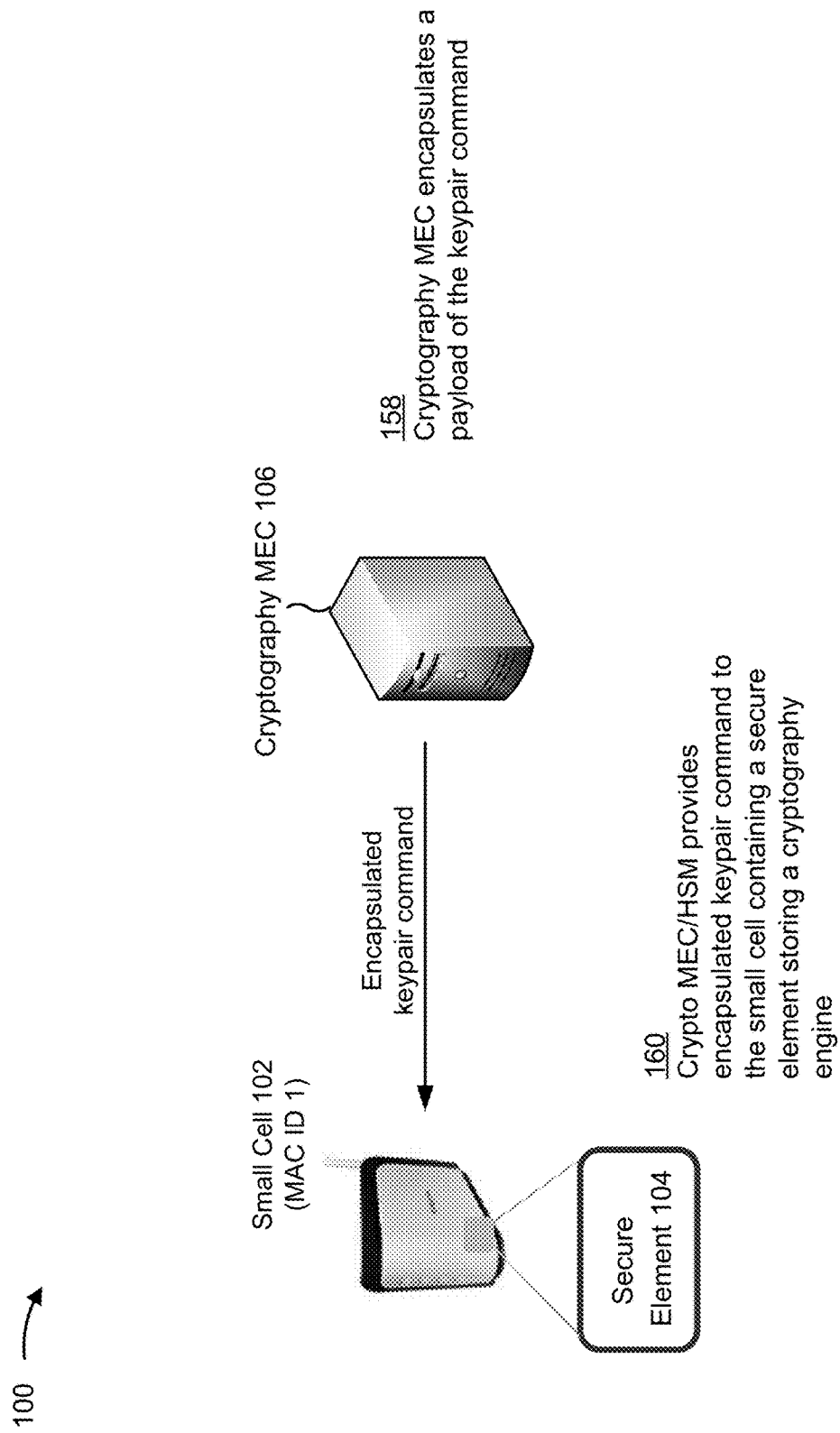

As shown in FIG. 1E, and by reference number 158, cryptography MEC 106 may encapsulate a payload of the keypair command. As shown by reference number 160, cryptography MEC 106 may provide the encapsulated keypair command to small cell 102. In this case, small cell 102 provides the encapsulated keypair command to secure element 104 for processing using a cryptography engine of secure element 104.

Figure 1F:
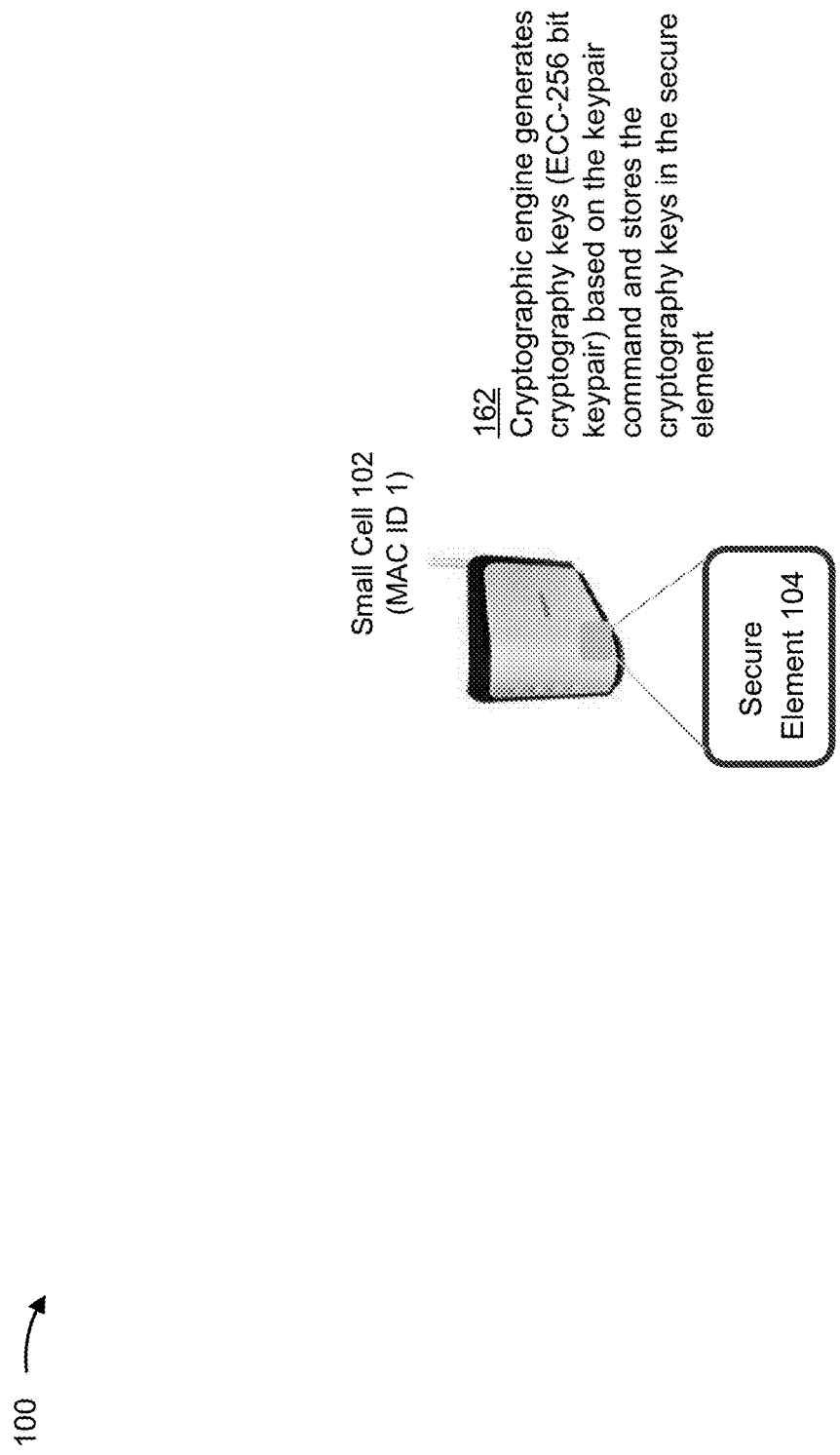

As shown in FIG. 1F, and by reference number 162, small cell 102 may use a cryptographic engine of secure element 104 to generate a cryptography key. For example, based at least in part on receiving the encapsulated keypair command indicating a use of a new security attribute (e.g., ECC-256), small cell 102 may use secure element 104 to generate one or more cryptographic keys for the new security attribute. In this case, small cell 102 may store the one or more cryptographic keys in secure element 104.

As shown in FIG. 1G, and by reference number 164, small cell 102 may provide public key information to TSM server 108. For example, small cell 102 obtains a public key, of the one or more cryptographic keys generated by and stored in secure element 104, and provides the public key to TSM server 108 via cryptography MEC 106.

Figure 1H:
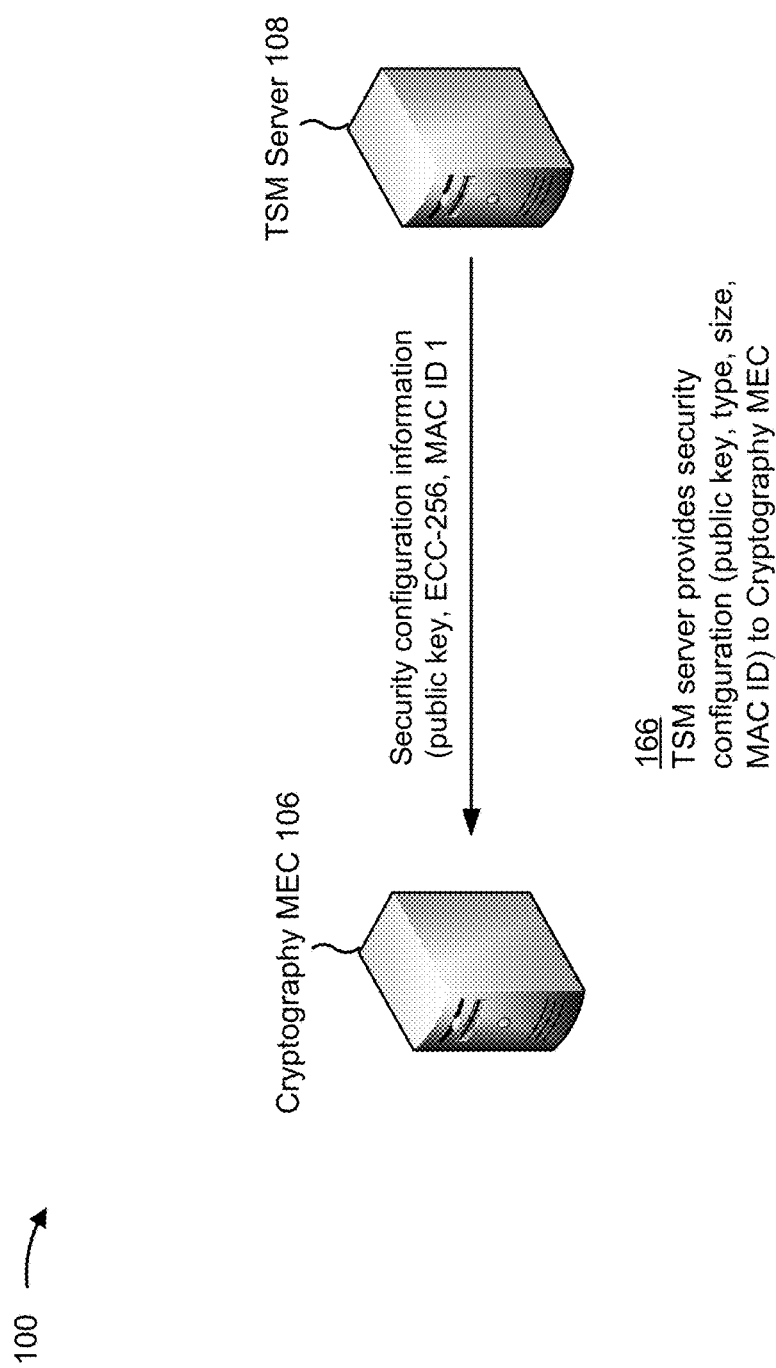

As shown in FIG. 1H, and by reference number 166, TSM server 108 may provide security configuration information to cryptography MEC 106. For example, TSM server 108 provides information identifying the public key, a type of security attribute to which the public key pertains (e.g., ECC-256), a device for which the public key is to be used for communication (e.g., a MAC identifier identifying small cell 102), and/or the like.

Figure 1I:
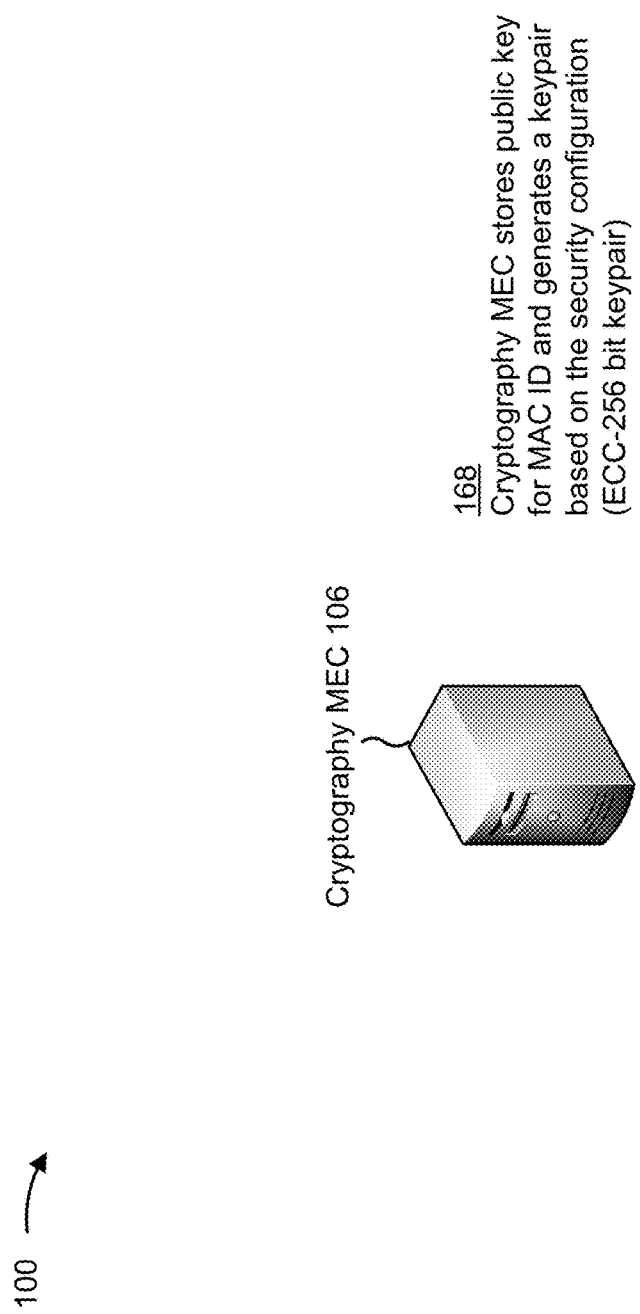

As shown in FIG. 1I, and by reference number 168, cryptography MEC 106 may store the received public key. For example, cryptography MEC 106 stores the public key received from small cell 102 and generates a keypair corresponding to the public key. In this case, cryptography MEC 106 may generate the keypair based at least in part on the security configuration information. For example, after receiving the public key, cryptography MEC 106 may use the security configuration to generate a corresponding key using the same security attribute (e.g., ECC-256 encryption).

As shown in FIG. 1J, and by reference number 170, small cell 102 and cryptography MEC 106 may communicate using an IPSec tunnel established based at least in part on an updated security attribute. For example, after generating a public key for ECC-256 encryption, small cell 102 and cryptography MEC 106 may terminate an RSA-128 based IPSec tunnel and establish an ECC-256 encryption-based IPSec tunnel. In this case, after establishing the ECC-256 encryption-based IPSec tunnel, small cell 102 may communicate using the ECC-256 encryption based IPSec tunnel. In this way, small cell 102 uses secure element 104 to enable dynamic reconfiguration of security attributes for communication with a network (e.g., via cryptography MEC 106). Moreover, based at least in part on enabling dynamic reconfiguration of security attributes, small cell 102, cryptography MEC 106, TSM server 108, and/or the like enable improved information security relative to using a static security attribute. Furthermore, as described in more detail above, based at least in part on enabling dynamic reconfiguration of security attributes, small cell 102, cryptography MEC 106, TSM server 108, and/or the like enable improved utilization of network and/or device resources by enabling dynamic shifting to less resource intensive security attributes (e.g., for low-security data, when a threat detection level is less than a threshold level, and/or the like).

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
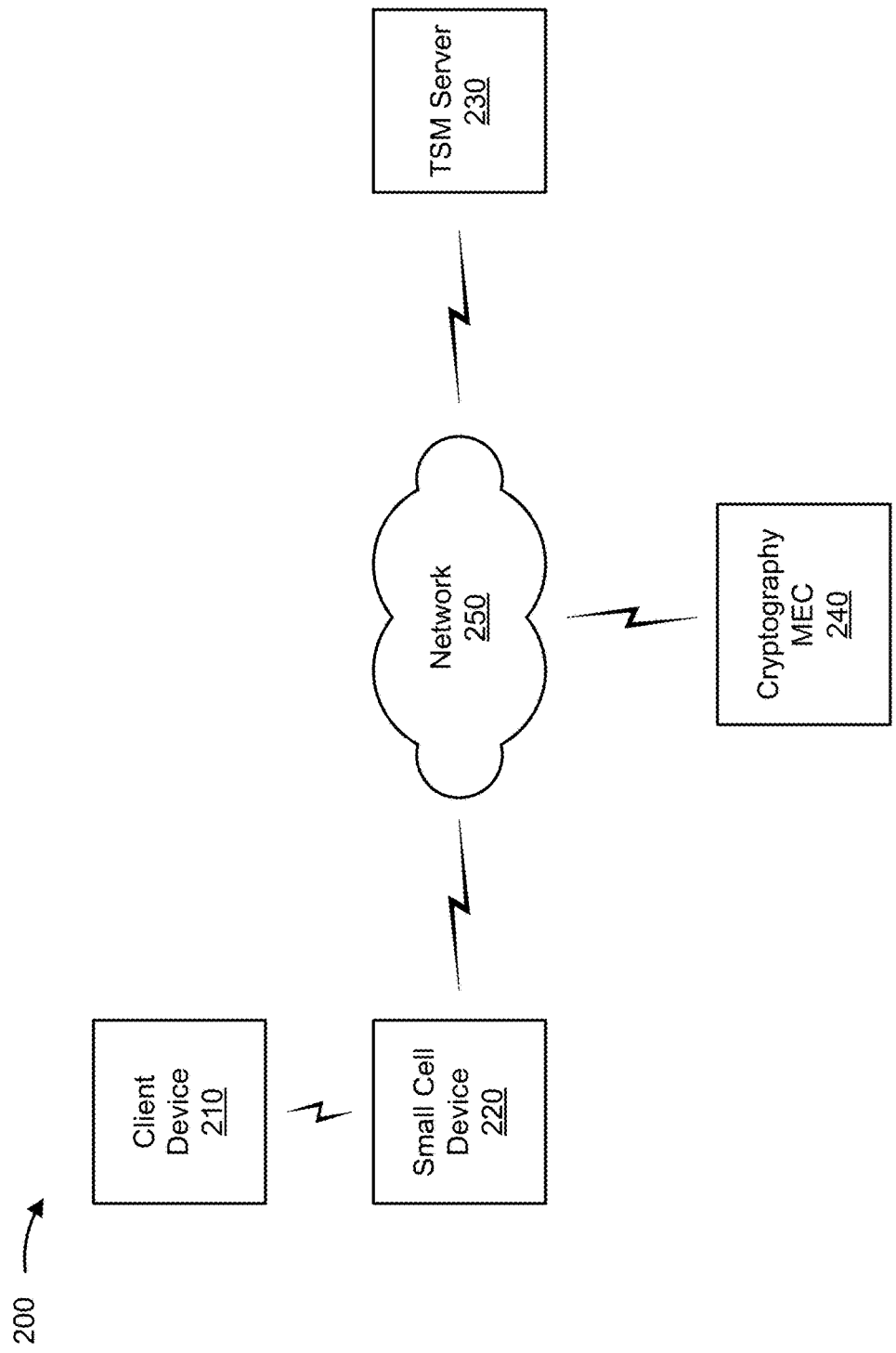
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a small cell device 220, a TSM server device 230, a cryptography MEC 240, and a network 250. Devices of environment 200 may interconnect via wired connections, wireless connections, or a combination of wired and wireless connections.

The client device 210 includes one or more devices capable of receiving, generating, storing, processing, and/or providing information associated with configuring a secure connection between small cell device 220 and, for example, cryptography MEC 240, as described elsewhere herein. The client device 210 may include a communication device and/or a computing device. For example, the client device 210 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 210 may communicate with one or more other devices of environment 200, as described elsewhere herein.

The small cell device 220 includes one or more devices capable of transferring traffic, such as audio, video, text, and/or other traffic, destined for and/or received from client device 210 and/or other devices connected to small cell device 220. Small cell device 220 can send traffic to and/or receive traffic from client device 210 via an air interface. In some implementations, small cell device 220 can include one or more small cell base stations, such as a base station of a microcell, a picocell, and/or a femtocell. In some implementations, small cell device 220 includes a secure element (e.g., a hardware element or a software element) to enable dynamic generation of a cryptographic key for secure communications via an IPSec tunnel with cryptography MEC 240. For example, small cell device 220 may include a cryptography engine that includes a processor stored in a secure area of the small cell device, a memory stored in a secure area of the small cell device, a set of instructions stored in a secure area of the small cell device, and/or the like. The secure area of the small cell device may include an area with limited read/write access, such as an area for which alteration is performed by physical interaction (e.g., by removing or inserting a component) rather than by network-based interaction. Although some implementations are described in terms of an IPSec tunnel, other types of communication channels and/or protocols are possible.

The TSM server device 230 includes one or more devices capable of receiving, generating, storing, processing, providing, and/or routing information associated with a security attribute, as described elsewhere herein. The TSM server device 230 may include a communication device and/or a computing device. For example, the TSM server device 230 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. In some implementations, the TSM server device 230 is a component of a home evolved management system (HeMS). The TSM server device 230 may communicate with one or more other devices of environment 200, as described elsewhere herein. In some implementations, TSM server device 230 may be an administrative device that a customer uses to control cryptography MEC 240. For example, TSM server device 230 may push security enhancements to cryptography MEC 240. In this way, the customer can request and implement a particular type of security, regardless of existing small cell device 220's capabilities, by altering the small cell device 220's capabilities to implement the particular type of security with cryptograph MEC 240.

The cryptography MEC 240 includes one or more devices capable of receiving, generating, storing, processing, providing, and/or routing information associated with a security attribute, as described elsewhere herein. The cryptography MEC 240 may include a communication device and/or a computing device. For example, the cryptography MEC 240 may include a server, an application server, a client server, a web server, a database server, a host server, a proxy server, a virtual server (e.g., executing on computing hardware), a server in a cloud computing system, a gateway, a device that includes computing hardware used in a cloud computing environment, or a similar type of device. In some implementations, cryptography MEC 240 is a secure gateway device that forms an IPSec tunnel with small cell device 220 to enable communication via a backhaul network of an internet service provider (ISP). The cryptography MEC 240 may communicate with one or more other devices of environment 200, as described elsewhere herein. In some implementations, cryptography MEC 240 may be implemented as a bump-in-the-wire (BITW) communication device within a communications system. For example, cryptography MEC 240 may be a security gateway or a network firewall implemented within a network that already includes, for example, one or more small cell devices 220, client devices 210, access points, gateways, routers, hubs, and/or the like.

The network 250 includes one or more wired and/or wireless networks. For example, the network 250 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
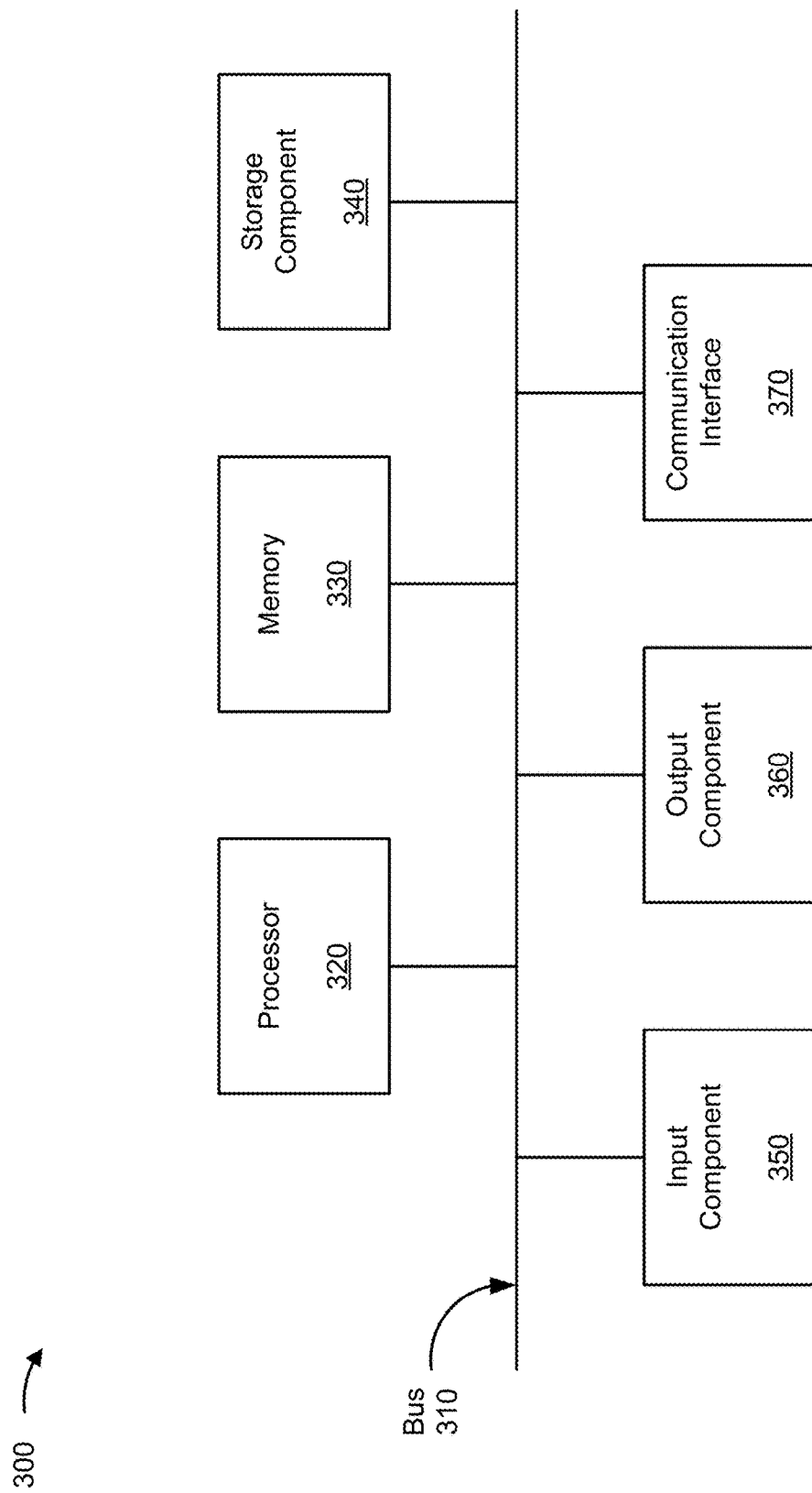
FIG. 3 is a diagram of example components of one or more devices of FIG. 2.

FIG. 3 is a diagram of example components of a device 300. Device 300 may correspond to client device 210, small cell device 220, TSM server device 230, and/or cryptography MEC 240. In some implementations, client device 210, small cell device 220, TSM server device 230, and/or cryptography MEC 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, an RF interface, a universal serial bus (USB) interface, a wireless local area interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
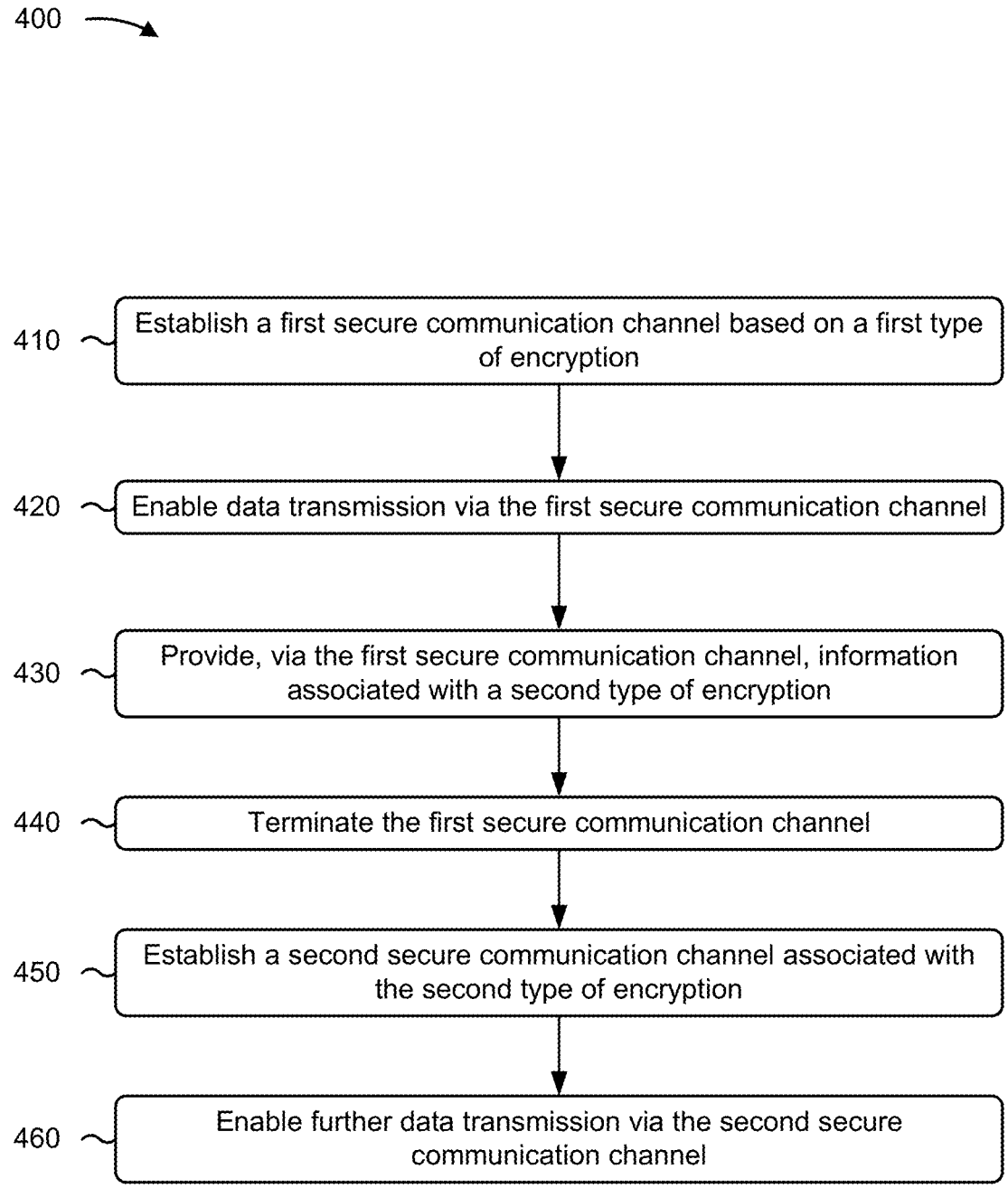
FIG. 4 is a flow chart of an example process relating to dynamically modifying security attributes associated with a secure communication channel.

FIG. 4 is a flow chart of an example process 400 associated with systems and methods for dynamic cryptography for small cells. In some implementations, one or more process blocks of FIG. 4 may be performed by a cryptography engine of a TSM server (e.g., TSM server 230). In some implementations, one or more process blocks of FIG. 4 may be performed by another device or a group of devices separate from or including the device, such as a client device (e.g., client device 210), a small cell device (e.g., small cell device 220), a cryptography MEC (e.g., cryptography MEC 240), and/or the like. Additionally, or alternatively, one or more process blocks of FIG. 4 may be performed by one or more components of a device 300, such as processor 320, memory 330, storage component 340, input component 350, output component 360, communication interface 370, and/or the like.

As shown in FIG. 4, process 400 may include establishing a first secure communication channel based on a first type of encryption (block 410). For example, the TSM server may establish a first secure communication channel between the small cell device and a network device external to the small cell based on a first type of encryption, as described above. In a first implementation, the network device comprises a mobile edge computing node.

As further shown in FIG. 4, process 400 may include enabling data transmission via the first secure communication channel (block 420). For example, the TSM server enable data transmission between a small cell of a small cell device and a core network via the first secure communication channel, as described above.

As further shown in FIG. 4, process 400 may include providing, via the first secure communication channel, information associated with a second type of encryption (block 430). For example, the TSM server may provide, via the first secure communication channel, information associated with a second type of encryption, as described above. In a first implementation, the second type of encryption is different from the first type of encryption. In a second implementation, alone or in combination with the first implementation, process 400 includes generating a keypair based on the information associated with the second type of encryption, wherein the further data is being transmitted via the second secure communication channel based on the keypair. In a third implementation, alone or in combination with one or more of the first and second implementations, the first type of encryption is associated with a first keypair associated with a first quantity of bits and the second type of encryption is associated with a second keypair associated with a second quantity of bits that is different than the first quantity of bits.

In a fourth implementation, alone or in combination with one or more of the first through third implementations, the second type of encryption provides an increased level of security relative to the first type of encryption. In a fifth implementation, alone or in combination with one or more of the first through fourth implementations, the first type of encryption is associated with a first hash algorithm and the second type of encryption is associated with a second hash algorithm that is different from the first hash algorithm. In a sixth implementation, alone or in combination with one or more of the first through fifth implementations, the first type of encryption provides a higher level of security relative to the second type of encryption. In a seventh implementation, alone or in combination with one or more of the first through sixth implementations, process 400 includes generating a public key and a private key based on the second set of security attributes; transmitting the public key to the network device; and establishing the second secure communication channel based on the public key and the private key.

In an eighth implementation, alone or in combination with one or more of the first through seventh implementations, the first type of encryption and the second type of encryption utilize different ones of: a public key encryption algorithm, a data encryption standard algorithm, a blowfish encryption algorithm, or a twofish encryption algorithm. In a ninth implementation, alone or in combination with one or more of the first through eighth implementations, the first type of encryption comprises a particular type of encryption associated with a first keypair associated with a first quantity of bits, and the second type of encryption comprises the particular type of encryption associated with a second keypair associated with a second quantity of bits that is different from the first quantity of bits. In a tenth implementation, alone or in combination with one or more of the first though ninth implementations, the first type of encryption is a 128-bit or smaller encryption and the second type of encryption is a 256-bit or larger encryption. In an eleventh implementation, alone or in combination with one or more of the first through tenth implementations, the set of security attributes are based on data input by a user associated with the small cell.

As further shown in FIG. 4, process 400 may include terminating the first secure communication channel (block 440). For example, the TSM server may terminate the first secure communication channel, as described above.

As further shown in FIG. 4, process 400 may include establishing a second secure communication channel associated with the second type of encryption (block 450). For example, the TSM server may establish a second secure communication channel between the small cell device and the network device based on the information associated with the second type of encryption, as described above. In a twelfth implementation, alone or in combination with one or more of the first through eleventh implementations, process 400 includes determining, by the small cell device, that a condition has been satisfied; terminating the second secure communication channel based on the condition being satisfied; and reestablishing the first secure communication channel based on terminating the second secure communication channel.

In a thirteenth implementation, alone or in combination with one or more of the first and twelfth implementations, establishing the second secure communication channel includes transmitting a public key associated with the second type of encryption to the network device, and establishing the second secure communication channel based on the public key. In a fourteenth implementation, alone or in combination with one or more of the first through thirteenth implementations, establishing the second secure communication channel includes: establishing the second secure communication channel based on the occurrence of an event. In a fifteenth implementation, alone or in combination with one or more of the first through fourteenth implementations, process 400 includes determining an occurrence of an event; and establishing the second secure communication channel based on the occurrence of the event.

As further shown in FIG. 4, process 400 may include enabling further data transmission via the second secure communication channel (block 460). For example, the TSM server may enable further data transmission between the small cell and the core network via the second secure communication channel, as described above. In a sixteenth implementation, alone or in combination with one or more of the first through fifteenth implementations, process 400 includes determining a time period associated with the second secure communication channel based on the second set of security attributes; determining that the time period has elapsed; terminating the second secure communication channel based on the time period having elapsed; and re-establishing the first secure communication channel based on terminating the second secure communication channel. In a seventeenth implementation, alone or in combination with one or more of the first through sixteenth implementations, process 400 includes determining an occurrence of an event, wherein the second set of security attributes includes information identifying the event; terminating the second secure communication channel based on the occurrence of the event; and re-establishing the first secure communication channel based on terminating the second secure communication channel.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
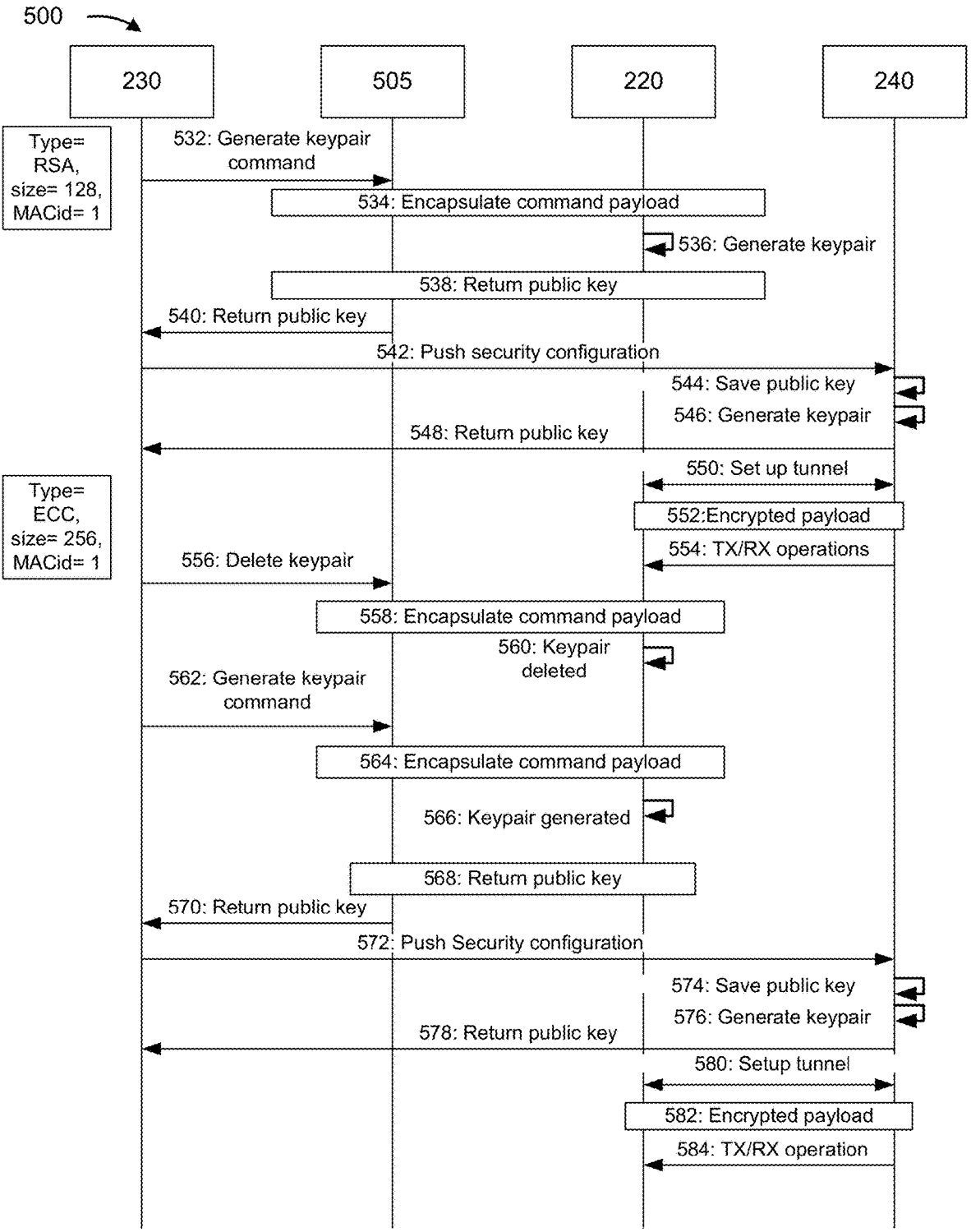
FIG. 5 is a call flow diagram relating to the example process shown in FIG. 4.

FIG. 5 is a call flow diagram illustrating an example 500 of dynamic cryptography for small cells. As shown in FIG. 5, example 500 includes small cell device 220, TSM server device 230, cryptography MEC 240, and HeMS 505. In some implementations, TSM server device 230 may be a component of HeMS 505.

At 532, TSM server device 230 may generate a keypair command and provide the keypair command to HeMS 505. For example, when small cell device 220 and cryptography MEC 240 are communicating using RSA cryptography (RSA-128) and small cell device 220 has a first MAC identifier, TSM server device 230 may pass a keypair command within information identifying the encryption type and the first MAC identifier to HeMS 505.

At 534, HeMS 505 may encapsulate a command payload of the keypair command via an encapsulation protocol (e.g., Technical Report 069 (TR-069) application layer protocol) and convey the command payload to small cell device 220. At 536, based at least in part on receiving the command payload, small cell device 220 generates an RSA-128 keypair and saves the RSA-128 keypair in a secure element with an association to the first MAC identifier. At 538, small cell device 220 may return a public key, generated in connection with generating the RSA-128 keypair, to HeMS 505.

At 540, HeMS 505 may provide the public key to TSM server device 230. At 542, TSM server device 230 may push a security configuration to cryptography MEC 240. For example, based at least in part on receiving the public key from small cell device 220 (e.g., via HeMS 505), TSM server device 230 may provide security configuration information identifying the public key, an encryption type, a size of the public key, a MAC identifier to which the public key corresponds, and/or the like. At 544, cryptography MEC 240 saves the public key in connection with the MAC identifier to enable subsequent communication with small cell device 220 via RSA-128 encryption. At 546 and 548, as a response to receiving the public key, cryptography MEC 240 generates an RSA-128 keypair and provides a public key to TSM server device 230 (e.g., which may receive the public key via HeMS 505 and which may provide the public key to small cell device 220).

At 550, using public keys generated by small cell device 220 and cryptography MEC 240, respectively, small cell device 220 and cryptography MEC 240 may establish a tunnel using RSA-128 public key infrastructure (PKI) procedures. For example, small cell device 220 and cryptography MEC 240 may establish an IPSec tunnel with RSA-128 encryption. At 552 and 554, using the established tunnel, small cell device 220 and cryptography MEC 240 may communicate RSA-128 encrypted payload. For example, cryptography MEC 240 may provide secure access between small cell device 220 to a core network via an IPSec tunnel established with small cell device 220. In this way, the aforementioned devices enable establishment of an IPSec tunnel using a first type of encryption.

At 556, TSM server device 230 may cause HeMS 505 to transmit an instruction to delete a keypair for small cell device 220. For example, TSM server device 230 may be triggered, as described above, to switch from RSA-128 encryption to ECC-256 encryption for small cell device 220, and may provide an instruction to HeMS 505 to delete a keypair for a MAC identifier corresponding to small cell device 220. At 558, HeMS 505 may encapsulate a command payload for the delete keypair command (e.g., using TR-069 application layer protocol) and may provide the command payload to small cell device 220. At 560, small cell device 220 may delete the keypair from a secure element of small cell device 220. For example, based at least in part on receiving the delete keypair command, small cell device 220 may delete a public key of cryptography MEC 240, a public key of small cell device 220, and/or the like and may disestablish the IPSec tunnel with cryptography MEC 240.

At 562, TSM server device 230 may pass a generate keypair command to HeMS 505. For example, as described above, TSM server device 230 may provide security configuration information identifying a new encryption technique, ECC-256, and a MAC identifier corresponding to small cell device 220, which is to use the new encryption technique. At 564, 566, 568, and 570, HeMS may pass the generate keypair command to small cell device 220, small cell device 220 may generate a keypair using a secure element, and small cell device 220 may provide a public key associated with the keypair to HeMS 505 and onward to TSM server device 230.

At 572, 574, 576, and 578, based at least in part on receiving the public key, TSM server device 230 may provide security configuration information and the public key to cryptography MEC 240, which may save the public key, generate an ECC-p256 keypair, and provide a public key thereof back to TSM server device 230 (which may provide the public key of cryptography MEC 240 to small cell device 220).

At 580, 582, and 584, small cell device 220 and cryptography MEC 240 may establish an ECC-p256 encrypted IPSec tunnel and communicate using the ECC-p256 encrypted IPSec tunnel. In this way, the aforementioned devices enable dynamic switching from using an IPSec tunnel with the first type of encryption to using an IPSec tunnel with the second type of encryption.

As indicated above, FIG. 5 is provided as an example. Other examples may differ from what is described with respect to FIG. 5.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    establishing, by a security device, a first secure communication channel between a small cell device and a network device external to a small cell of the small cell device based on a first type of encryption;
    enabling, by the security device, data transmission between the small cell and a core network via the first secure communication channel;
    providing, by the security device and via the first secure communication channel between the small cell device and the network device, information associated with a second type of encryption to reconfigure a cryptographic engine of the small cell device to have a second capability for the second type of encryption,
        wherein the small cell device is to utilize the second capability,
        wherein the second type of encryption is different from the first type of encryption, and
        wherein the small cell device, the security device, and the network device are different devices;
    receiving, by the security device, security configuration information;
    terminating, by the security device, the first secure communication channel based on receiving the security configuration information;
    establishing, by the security device, a second secure communication channel between the small cell device and the network device using the second type of encryption; and
    enabling, by the security device, further data transmission between the small cell device and the core network via the second secure communication channel.

2. The method of claim 1, further comprising:
    providing, by the security device and to the network device, keypair generation information associated with the second type of encryption,
        wherein the further data transmission is communicated via the second secure communication channel based on the keypair.

3. The method of claim 1, wherein the first type of encryption is associated with a first keypair associated with a first quantity of bits and the second type of encryption is associated with a second keypair associated with a second quantity of bits that is different than the first quantity of bits.

4. The method of claim 1, wherein establishing the second secure communication channel is established using, a public key associated with the second type of encryption to the network device.

5. The method of claim 1, further comprising:
    determining, by the security device, an occurrence of an event; and
    wherein establishing the second secure communication channel includes:
        establishing, by the security device, the second secure communication channel based on the occurrence of the event.

6. The method of claim 1, further comprising:
    determining, by the security device, that a condition has been satisfied;
    terminating, by the security device, the second secure communication channel based on the condition being satisfied; and re-establishing, by the security device, the first secure communication channel based on terminating the second secure communication channel,
wherein the first secure communication channel is based on the first type of encryption.

7. The method of claim 1, wherein the second type of encryption provides an increased level of security relative to the first type of encryption.

8. A security device, comprising:
one or more processors configured to:
establish a first secure communication channel between a small cell device and a network device based on a first set of security attributes associated with a first type of encryption;
enable data transmission between the small cell device and the network device via the first secure communication channel;
provide, via the first secure communication channel between the small cell device and the network device, a second set of security attributes associated with a second type of encryption,
wherein the small cell device is to utilize the second set of security attributes, and
wherein the small cell device, the security device, and the network device are different devices;
receive security configuration information;
terminate the first secure communication channel based on receiving the security configuration information;
establish a second secure communication channel between the small cell device and the network device based on providing the second set of security attributes; and
enable further data transmission between the small cell device and the network device via the second secure communication channel rather than the first secure communication channel.

9. The security device of claim 8, wherein the first type of encryption is associated with a first hash algorithm and the second type of encryption is associated with a second hash algorithm that is different from the first hash algorithm.

10. The security device of claim 8, wherein the first type of encryption provides a higher level of security relative to the second type of encryption.

11. The security device of claim 8, wherein the second secure communication channel is established using a public key and a private key that are based on the second set of security attributes.

12. The security device of claim 8, wherein the one or more processors are further configured to:
determine an occurrence of an event; and
wherein the one or more processors, when establishing the second secure communication channel, are to:
establish the second secure communication channel based on the occurrence of the event.

13. The security device of claim 8, wherein the one or more processors are further configured to:
determine a time period associated with the second secure communication channel based on the second set of security attributes;
determine that the time period has elapsed;
terminate the second secure communication channel based on the time period having elapsed; and
re-establish the first secure communication channel based on terminating the second secure communication channel,
wherein the first secure communication channel is based on the first type of encryption.

14. The security device of claim 8, wherein the first type of encryption and the second type of encryption utilize different ones of:
a public key encryption algorithm,
a data encryption standard algorithm,
a blowfish encryption algorithm, or
a twofish encryption algorithm.

15. A non-transitory computer-readable medium storing instructions, the instructions comprising:
one or more instructions that, when executed by one or more processors of a security device, cause the one or more processors to:
receive, by the security device and via a first secure communication channel established between a small cell device of a small cell and a network device external to the small cell, a set of security attributes for changing a type of encryption associated with the first secure communication channel;
establish a second secure communication channel between the small cell device and the network device based on the set of security attributes,
wherein the small cell device is to utilize the set of security attributes,
wherein the first secure communication channel is associated with a first type of encryption and the second secure communication channel is associated with a second type of encryption that is different from the first type of encryption,
wherein the first secure communication channel is to be terminated when the second secure communication channel is established based on receiving security configuration information, and
wherein the small cell device, the security device, and the network device are different devices; and
transmit data between the small cell device and the network device via the second secure communication channel.

16. The non-transitory computer-readable medium of claim 15, wherein the first type of encryption comprises a particular type of encryption associated with a first keypair associated with a first quantity of bits and the second type of encryption comprises the particular type of encryption associated with a second keypair associated with a second quantity of bits that is different from the first quantity of bits.

17. The non-transitory computer-readable medium of claim 15, wherein the first type of encryption is a 128-bit or smaller encryption and the second type of encryption is a 256-bit or larger encryption.

18. The non-transitory computer-readable medium of claim 15, wherein the network device comprises a mobile edge computing node.

19. The non-transitory computer-readable medium of claim 15, wherein the set of security attributes are based on data input by a user associated with the small cell.

20. The non-transitory computer-readable medium of claim 15, wherein the one or more instructions, when executed by the one or more processors, further cause the one or more processors to:
determine an occurrence of an event,
wherein the set of security attributes includes information identifying the event;
terminate the second secure communication channel based on the occurrence of the event; and
re-establish the first secure communication channel based on terminating the second secure communication channel, wherein the first secure communication channel is based on the first type of encryption.

\* \* \* \* \*